U.S. Patent No.: US 10,505,945 B2
Date of Patent: *Dec. 10, 2019

(12) United States Patent
Kaguma et al.

(54) AUTOMATED GRANTING OF ACCESS TO NETWORKS AND SERVICES FOR PRE-PAID DEVICES

(71) Applicant: International Business Machines Corporation, Armonk, NY (US)

(72) Inventors: David Kaguma, Nairobi (KE); Juliet K. Mutahi, Nairobi (KE); Skyler D. Speakman, Nairobi (KE); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,511

(22) Filed: Dec. 30, 2017

(65) Prior Publication Data

US 2018/0351964 A1 Dec. 6, 2018

Related U.S. Application Data

(63) Continuation of application No. 15/613,243, filed on Jun. 4, 2017.

(51) Int. Cl.
*H04L 9/00* (2006.01)
*H04L 29/06* (2006.01)
(Continued)

(52) U.S. Cl.
CPC ........ *H04L 63/105* (2013.01); *H04L 63/0838* (2013.01); *H04L 63/0853* (2013.01);
(Continued)

(58) Field of Classification Search
CPC . H04L 63/105; H04L 63/108; H04L 63/0838; H04L 63/0853; H04W 12/06; H04W 12/08
See application file for complete search history.

(56) References Cited

U.S. PATENT DOCUMENTS 6,119,933 A  9/2000 Wong
6,795,700 B2  9/2004 Karaoguz
(Continued)

FOREIGN PATENT DOCUMENTS

WO  2010033872 A2  3/2010
WO  2011026121 A2  3/2011

OTHER PUBLICATIONS

James Chavin et al., The future of mobile messaging: Over-the-top competitors threaten SMS, McKinsey & Company Telecom, Sep. 2012, p. 1-7.
(Continued)

*Primary Examiner* — Beemnet W Dada
(74) *Attorney, Agent, or Firm* — Eyal Gilboa; Otterstedt, Wallace & Kammer, LLP

(57) ABSTRACT

Herein are methods and systems for automated assessment of user devices and associated data, and granting access to wireless networks based on the assessment. For example, the systems and methods assess a user request for access to a wireless network at an access point, and automatically determine the type of access to be granted based on at least a loyalty score associated with the user. The automatic assessment can be used to encourage customer loyalty as well as to manage limited network resources.

14 Claims, 4 Drawing Sheets

(51) Int. Cl.
*H04W 12/08* (2009.01)
*H04W 12/06* (2009.01)

(52) U.S. Cl.
CPC .......... *H04L 63/104* (2013.01); *H04L 63/108* (2013.01); *H04W 12/06* (2013.01); *H04W 12/08* (2013.01); *H04L 2463/121* (2013.01)

(56) References Cited

U.S. PATENT DOCUMENTS

| | | | |
|---|---|---|---|
| 7,643,411 | B2 | 1/2010 | Andreasen |
| 7,917,395 | B2 | 3/2011 | Crawford |
| 8,670,310 | B2 | 3/2014 | Sharma |
| 8,887,260 | B2 * | 11/2014 | Marcotte ................ G06F 21/33 713/189 |
| 9,179,006 | B2 | 11/2015 | Ganesan |
| 2003/0051041 | A1 | 3/2003 | Kalavade |
| 2006/0095786 | A1 | 5/2006 | Aaron |
| 2012/0203572 | A1 | 8/2012 | Christensen |
| 2012/0230481 | A1 | 9/2012 | Titus |
| 2015/0006747 | A1 | 1/2015 | Pilkington |
| 2015/0237074 | A1 * | 8/2015 | Mardikar ................ H04L 63/20 726/1 |
| 2015/0295808 | A1 | 10/2015 | O'Malley |
| 2015/0312236 | A1 * | 10/2015 | Ducker ................ H04L 63/08 726/4 |
| 2015/0334594 | A1 | 11/2015 | Stephens |

OTHER PUBLICATIONS

David Kaguma et al., unpublished U.S. Appl. No. 15/613,243 filed Jun. 4, 2017, Automated Granting of Access to Networks and Services for Pre-Paid Devices, pp. 1-28 plus 4 sheets of drawings.
Paul J. Otterstedt, List of IBM Patents or Patent Applications Treated as Related, Jun. 28, 2018, pp. 1-2.

* cited by examiner

AUTOMATED GRANTING OF ACCESS TO NETWORKS AND SERVICES FOR PRE-PAID DEVICES

CROSS-REFERENCE TO RELATED APPLICATIONS

This application is a continuation of U.S. patent application Ser. No. 15/613,243 filed Jun. 4, 2017, the complete disclosure of which is expressly incorporated herein by reference in its entirety for all purposes.

BACKGROUND

In embodiments, the technical field of the invention is methods and systems for automated assessment and granting of access to wireless networks by user devices.

WiFi hotspots are becoming more common in emerging markets. Businesses may use them to attract foot traffic, push advertising, or as a perk for certain customers. Wifi providers have an interest in allowing access to or features of Wifi services to 'loyal' customers. In developed markets with cellphone contracts (post-pay) this may be accomplished through pre-arranged sign-in details. However, the emerging market is dominated by pre-paid cell phone services and 'sim-switching' where a single customer may be (loosely) affiliated to multiple telephone providers. Therefore, simply having an account (i.e., SIM-card) for a particular telecom is too low of a barrier-to-entry for a Wifi service.

The emergence of affordable connected devices has also introduced a large market for data services. The new internet services often compete with the traditional offerings from the service providers since they are more competitively priced (e.g., text messages vs whatsapp). Messaging applications such as WhatsApp Telegram, and WeChat are becoming more popular than the traditional cell phone carrier-based SMS (Short Message Service).

Internet based text messaging adds a new dimension to messaging that completely surpasses traditional SMS. These features include group chats, ability to send large data files, and location check-ins. Such messaging applications are currently leading a paradigm shift away from traditional SMS and towards lower-cost and feature-rich alternatives. This has led to the need for active Internet connection and an enhanced market for Wifi services.

SUMMARY

In an aspect, then, is a method of mediating access to a computer network, the method comprising: identifying a user who wishes to access the computer network via a user device; obtaining loyalty data specific to the user; obtaining a user context factor specific to the user and determining a predicted usage level from the user context factor specific to the user; generating an access token based on the loyalty data specific to the user and the predicted usage level; and providing an output of a unique code derived from the access token, and transmitting the unique code to the user device, wherein the unique code is for one time access to the computer network, and requires validation by a gateway of the computer network for the user to access the computer network. In embodiments:

the access token specifies a usage level limit based on the predicted usage level;

identifying the user who wishes to access the computer network comprises accessing a database and retrieving from the database a profile for the user that specifies the loyalty data specific to the user;

further comprising identifying a group to which the user belongs and obtaining group contextual data specific to the identified group, and wherein the identified group comprises a plurality of users, and wherein the access token is further based on the obtained group contextual data;

the access token further comprises a time stamp;

the unique code is an image, a scannable code, or an alpha-numeric code;

further comprising: receiving a request from the user for access to the computer network; and providing access to the computer network to the user according to the token;

further comprising: receiving a request from the user for access to the computer network; checking that the request received from the user to access the computer network is derived from the output provided to the user; and providing access to the computer network to the user according to the token;

the user device comprises a SIM and wherein accessing the computer network is via a WiFi connection;

further comprising determining a loyalty score specific to the user based on the loyalty data specific to the user, wherein the loyalty score is determined based at least in part on statistical machine learning techniques and wherein the loyalty data specific to the user is telecom data specific to the user;

further comprising determining a loyalty score specific to the user based on the loyalty data specific to the user, wherein the loyalty score is determined based at least in part on predicted future behavior of the user;

the user context factor is determined from data received from the user device or from an external source, and wherein the access token is further based on the user context factor;

the access token is further based on one or more factors selected from: a current overall usage level of the computer network; the user's prior usage behavior; service type; and a current signal strength for the user device in accessing the computer network;

the output is configured to alter a user interface on the user device;

the access token specifies a usage level limit based on the predicted usage level, and the method further comprises: receiving a request from the user for access to the computer network; and providing access to the computer network to the user according to the token;

the user context factor is determined from data received from the user device or from an external source, and wherein the access token is further based on the user context factor, and the output is configured to alter a user interface on the user device;

the access token is further based on one or more factors selected from: a current overall usage level of the computer network; the user's prior usage behavior; service type; and a current signal strength for the user device in accessing the computer network, and the output is configured to alter a user interface on the user device; and the access token is further based on one or more factors selected from: a current overall usage level of the computer network; the user's prior usage behavior; service type; and a current signal strength for the user device in accessing the computer network, and the method further comprises: receiving a request from the user for access to the computer network; checking that the request received from the user to access the computer network is derived from the output provided to the user; and providing access to the computer network to the user according to the token;

In an aspect is a system for determining an optimal allocation of access or usage limit based on an assessment of the user's usage behavior and current and expected signal strength of the Wi-Fi as well as internet speed available.

In an aspect is a system for mediating access to a computer network, the system comprising: a communication module configured to receive a request from a user device, the request identifying a user who wishes to access the computer network via the user device; a database comprising loyalty data specific to the user and in communication with a data retrieval module configured to retrieve from the database loyalty data specific to the user; a usage predicting module configured for predicting a usage level specific for the user based on a context factor; a token module configured to generate an access token based on the loyalty data specific to the user and the predicted usage level; and an output module configured to provide an output of a unique code, derived from the access token, for communication to the user device by the communication module, wherein the unique code is for one-time access to the computer network, and requires validation by a gateway of the computer network for the user to access the computer network. In embodiments:

the database further comprises group data identifying a group to which the user belongs, and wherein the data retrieval module is further configured to retrieve from the database the group data specific to the user;

the communication module is further configured to receive context data from an external source;

the output module is configured such that the unique code is output as part of a message, the message configured to alter a user interface of the user device; and the database comprises loyalty data for a plurality of users, the loyalty data comprising data selected from: telecom data; financial data; and prior usage data.

These and other aspects of the invention will be apparent to one of skill in the art from the description provided herein, including the examples and claims.

DETAILED DESCRIPTION

Figure 1:
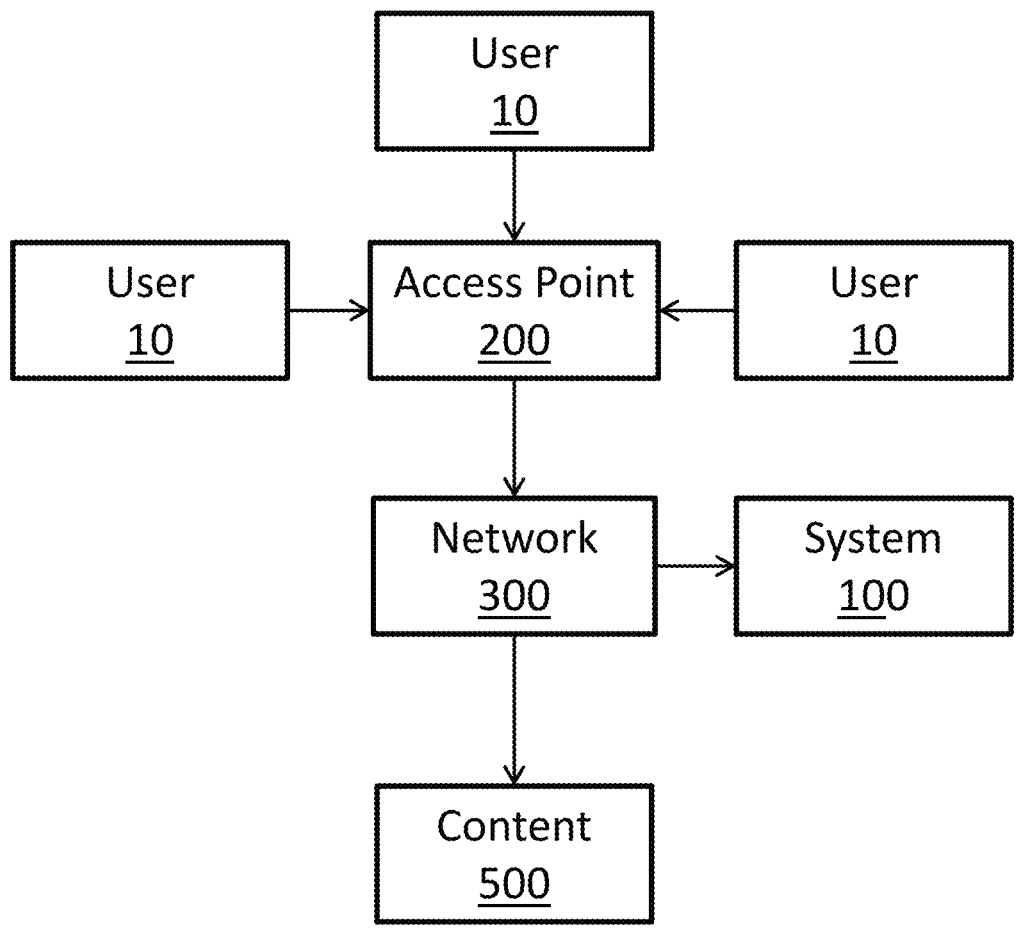
FIG. 1 provides a schematic showing user access of a network and content on the network according to an embodiment of the disclosure.

In aspects are devices configured to carry out the methods described herein. The devices may comprise a processor and a memory coupled to the processor, the memory configured to store program instructions for instructing the processor to carry out the method. Further details are provided herein. It will be appreciated, however, that certain components of such devices, and further certain steps of the associated methods, may be omitted from this disclosure for the sake of brevity. The omitted components and steps, however, are merely those that are routinely used in the art and would be easily determined and implemented by those of ordinary skill in the art using nothing more than routine experimentation, the general state of the art, and the disclosure herein. Throughout this specification, where hardware is described, it will be assumed that the devices and methods employing such hardware are suitably equipped with necessary software (including any firmware) to ensure that the devices/methods are fit for the described purpose.

In an aspect is a method and system comprising: a device, a means for determining or estimating a user loyalty score S on said device, an assessment of said user context C, a means for determining access or usage limit L based on said context, and, based on a function-of (S, P, L), the system grants the user access and/or Wifi service.

In an aspect is a method of mediating access to a computer network, the method comprising: identifying a user who wishes to access the computer network via a user device; obtaining loyalty data specific to the user; obtaining a user context factor specific to the user and determining a predicted usage level from the user context factor specific to the user; generating an access token based on the loyalty data specific to the user and the predicted usage level; and providing an output of a unique code derived from the access token, and transmitting the unique code to the user device, wherein the unique code is for one time access to the computer network, and requires validation by a gateway of the computer network for the user to access the computer network.

In an aspect is a system for determining an optimal allocation of access or usage limit based on an assessment of the user's usage behaviour and current/expected signal strength of the Wi-Fi as well as Internet speed available.

In an aspect is a system for mediating access to a computer network, the system comprising: a communication module configured to receive a request from a user device, the request identifying a user who wishes to access the computer network via the user device; a database comprising loyalty data specific to the user and in communication with a data retrieval module configured to retrieve from the database loyalty data specific to the user; a usage predicting module configured for predicting a usage level specific for the user based on a context factor; a token module configured to generate an access token based on the loyalty data specific to the user and the predicted usage level; and an output module configured to provide an output of a unique code, derived from the access token, for communication to the user device by the communication module, wherein the unique code is for one-time access to the computer network, and requires validation by a gateway of the computer network for the user to access the computer network.

A user device according to the disclosure is any device with wireless data capability. In embodiments the device is a SIM-enabled device. In embodiments the device is configured for voice transmissions (e.g., phone calls), data transmissions (e.g., Internet or applications using data), or the combination thereof. In embodiments the device is configured for voice and/or data using one or more cellular network(s). Devices with SIMs that are configured for accessing a 3G, 4G, or LTE network, or any other cellular network, are suitable. In embodiments the device is configured for pre-paid cellular network usage. In embodiments, the device is selected from a mobile phone, a tablet, and a sensor, or a combination thereof, or may be any other type of device configured as described herein.

The methods herein are initiated when a user (i.e., a user device containing a SIM) submits a request for network access (herein also referred to as an "access request" or simply "request") at an access point, as defined herein. The access request is submitted by the user device, for example, when the device comes into WiFi range of the access point. The request may be automatically sent by the user device (e.g., for networks that are "known" to the user device—such as those having been encountered previously) or may be manually initiated by the user using the device. The request may be accompanied by identifying information (again, automatically or manually selected and sent in the request) such as standard identification information pertaining to the SIM, to the device, and/or to the user. The request may be a general request for access, or may include further details such as a requested usage/access level or the like. The request is received at the access point and transmitted via a digital distributed network (e.g., the Internet) to a backend server. Throughout this disclosure, references to a "system" are references to the backend server and, in some embodiments, accompanying components as described herein. The backend server comprises a processor and machine-readable instructions suitable to enable the server to carry out the methods (in part or in whole, where appropriate) disclosed herein.

The system is configured to grant access to users in order to obtain optimal allocation of resources—e.g., specifically, to grant access or usage within limits suitable for a given context. The network access granted to the user may be determined such that, among other factors, a specific network access point or any specific component of a network is not overloaded. This can be achieved, e.g., by granting access that is limited in time, bandwidth, total uploadable/downloadable data, accessible content, or any combination thereof. For example, a user can be granted a specific period of time for accessing the network—e.g., less than or equal to 5, 10, 15, 20, 30, or 60 min, or in the range of 5-60 minutes (with such accessing being renewable or non-renewable as desired). Also for example, the user can be granted a limited amount of data for total download/upload—e.g., less than or equal to 5, 15, 25, 50, 100, or 1000 MB, or in the range of 5-1000 MB. Also for example, the user can be granted a limited bandwidth (network speed) such as less than or equal to 1, 5, 10, 15, 20, 25, or 50 MB/s. Also for example, the user can be granted limited access to specific content, data types, or activities (e.g., video files or movies or Internet browsing), or can be excluded from specific content, data types, or activities altogether. Any or all of these limitations can be used where appropriate depending on, for example, the user and factors specific to the user, and/or the network or other local contextual data.

To determine and grant access, in embodiments the system generates a loyalty score (as described herein) that is specific to a user or, more specifically, specific to a SIM. Typically, SIMs are registered to an individual user upon allocation by a network provider. In embodiments the user granted access by the methods/systems herein is the registered user for a specific SIM. However, the systems/methods herein may not be capable of verifying that the user of a device is, in fact, the registered user. Such verification is not necessary for this invention—whoever is using a user device with a SIM at the time of making a request for network access, whether or not it is the registered user of the SIM, will be granted access based on the data available for the SIM. Certain security measures such as biometric identification (voice, fingerprint, etc.) or passcodes may be used to ensure that the registered user is using the device, if desired or necessary.

Contextual Factors

Contextual factors may also be used to determine the type of network access granted. Contextual factors are factors that are not specific to the user making a request for network access. Such contextual factors may be instantaneous data points or may be historical data and trends. Examples of such factors include the following: the number of users currently accessing a network via a specific access point; the current data load at the specific access point; the infrastructure (e.g., wiring or fibre capacity, router capacity, etc.) used to create the specific access point; time of day; historical usage of the access point; upcoming current events likely to increase network demand (e.g., sporting events), and the like. These factors may be weighted or un-weighted and may be used in the determination of granted access as appropriate.

Other contextual factors may also be determined and applied. For example, the current or expected signal strength of the Wi-Fi at the access point (either generally or specific to the requesting device) may be considered. Another factor that may be considered is the Internet speed available to the access point. These and other factors may collectively be referred to as Quality-of-Service (QoS).

In addition to contextual factors as described, the determination by the systems/methods herein may further involve analysis of contextual factors that are specific to the requesting user. These are factors that are specific to the user making a network access request but are contextual rather than historical or aggregated. For example, the system may also perform context analysis based on the user activities: e.g. the user is opening an application (such as Whatsapp), and the mobile camera detected that the user is stressed, but the user does not have sufficient bundle for connectivity. In embodiments, the assessment of the user context involves the analysis of sensory data for: walking/driving (context: looking for directions) and for situation awareness (e.g. stressed, lost, disturbed, panic etc.).

Contextual analysis may further involve situational awareness factors. For example, the assessment involves the analysis of the user's current location with respect to heuristic data and third party reports to analyze and determine the location of the user and categorize the current situation (e.g. whether there is an emergency near or involving the user). The situational awareness may be based on a speech recognition algorithm; e.g., analysis of a call-log of the user may be used to understand the current context of the user. Such analysis may further be used to adjust or normalize the decision to grant access to connectivity or services.

In embodiments, and further in the area of contextual factors, the determination of the need to grant access to connectivity and services may be based on predicting when a user may require a certain service. For example, when the SIM detects that the user data bundle may be depleted or nearly depleted, but at the same time contextual factors indicate that the user needs access (e.g., the user is opening and using an application such as Whatsapp, Facebook messenger, Skype, Viber app, Google Map, twitter, Online Calendar, etc.), the resulting grant of access can be modified appropriately. For example, a user calendar may be used to inform the system that an important event is approaching (and, particularly, an event that may require the user to have network access).

In embodiments, a user context factor is determined from data received from the user device or from an external source. Such a context factor may include whether the user is walking or driving, the user's location, situation awareness, etc. and the determination may be by speech analysis, by analyzing third-party data, by analyzing call logs, or the like.

In embodiments, the contextual factor may include any of the following measures: a current overall usage level of the computer network; the user's prior usage behavior; service type; and a current signal strength for the user device in accessing the computer network. The "service type" refers that the type of the service (e.g., access to email access, assess to map service, assess to web browsing, etc.) that the user wished to gain access the computer network, and may be inferred from context or may be explicitly determined from user input.

In embodiments, a distribution algorithm may be used to intervene to modify the content for delivery to a different variant with the same meaning. For example, the algorithm may detect that it is appropriate to converting text to speech, such as for a person whose context is indicative of a user that is driving.

Furthermore, in embodiments, the system may determine that it is best to optimize or summarize information and present the summary to the user rather than the raw information. In embodiments, the system may change the delivery modality (e.g., instead of loading a digital map, the system may enable and initiate a synthetic/automated voice delivery function for direction. Again, these actions by the system are determined in part based on the user context and QoS values.

The determination of the user's current affective or cognitive state may use speech recognition, visual analytics or deep learning on the data from call logs, sensors (e.g., camera, GPS, accelerometer, gyroscope, etc.) of the mobile phone, or other sources of data as appropriate.

In embodiments, as part of the analysis of contextual factors, the system may assess the quality of service (QoS) prior to granting access to connectivity and services to the user. The system may determine the trade offs required for this user using a given QoS, the user's current context, and the user's profile, to determine the type and limit (L) of network access. The trade offs analysis may further include the network quality for the user based on optimality of retrieving the expected or requested content. This considers factors such as the current congestion rates on the service and hence either prioritizes the users requests or sends them to a different service endpoint whilst trying to maintain a minimum level quality of service.

As an example, for applications that are not data intensive (e.g., checking a calendar or stock market updates) a lower QoS may suffice, whilst for applications that are highly data intensive (e.g., streaming a video) a higher QoS may be required. The QoS can be used for thresholding purposes, e.g. reliable video is only possible over a specific level of QoS. The QoS measurement algorithm may further provide a feedback mechanism to the system herein to evaluate health of the services and network.

In embodiments, an intelligent selection algorithm may be used to maximize Internet availability on the user's device (as well as, optionally, devices of other users in the same area) and may further be configured to boost the loyalty score S for the user.

User Specific Data

In addition to contextual factors, the systems/methods herein employ user specific data to determine a loyalty score (also referred to herein as "S"). The loyalty score is an additional factor used by the systems/methods to ultimately determine a level of access in response to a request for access by the user. The user specific data may be obtained in a variety of forms, some of which are now described.

The loyalty score S is a measure of the user's usage of a provider's services over time. The provider, typically, is a telecom that functions as an ISP and provides Internet services through WiFi access points, such as an access point at which the user submits a request for access. The loyalty score, then, allows the system to determine a level of usage that rewards loyalty by the user. A variety of data and algorithms can be used to determine the loyalty score. The data can be obtained from a variety of sources, including directly from a user's SIM, from a telecom (e.g., a database of user activity stored by the telecom), or the like.

In embodiments the system may inspect a device's SIM details in order to identify customers that are loyal to a particular telecom and therefore grant access and/or wifi services based on their loyalty score. This inspection can look at the call logs, data usage, etc. as recorded by the SIM.

In embodiments, the determining or prediction the need for granting access to connectivity may be based on the analysis of history of the mobile phone usage data, assessment of the user's usage behavior (e.g., downloading a YouTube video vs Web browsing), and the like.

The locality score S may be changed based on mobile money transactions (e.g., mobile money system usage such as M-PESA, mobile money loan system usage such as M-Shwari), the usage of the GSM network (voice and data), historic pattern of data bundle usage and amount paid, type of services and usage information, etc. In embodiments, the determination of the loyalty score is based on statistical machine learning techniques using telecom data such as pre-paid purchase history and past mobile money transaction data (e.g. mobile money transactions), the usage of the GSM network (voice and data), etc.

In addition to the user loyalty score, a user profile can be used to determine the granted access. The user profile, in embodiments, comprises the user loyalty group, user job type, aggregated usage pattern, user cognitive/affective characteristics, job category, affective/cognitive state (e.g., stressed, lost, disturbed, panic etc.), user context (e.g., important checking meeting details from online electronic calendar), and the like. User profiles can be maintained (e.g., by the telecom, the ISP, or other entities) in a database indexed, for example, by SIM identification codes, user name or identification numbers, or the like.

In embodiments, the collection of the usage information may use a software utility running on the user device; the collection process may be strictly non-intrusive. Alternatively or in addition, the network service may be used to collect anonymized usage services about the user. The instrumentation and data collection aspects may be gleaned in a privacy-preserving manner. Some of this information is associated with user records for mobile money, call-log records, and the like, and in embodiments it is not necessary to provide the identity of the users. The assessment of the user context and behavior pattern may use historic usage to determine or estimate the user loyalty point S.

Furthermore, granting access to connectivity or services may be based on the prediction or likelihood of the user future data bundle purchase. Such predictions can be done using appropriate predictive algorithms based on prior usage, contextual information, and other information as appropriate.

In embodiments, the loyalty data specific to users is maintained in a database, such as the user profile database mentioned herein. The database can comprise information such as historical purchasing activities (e.g., data bundle purchases, airtime purchases, or the like), historical usage information (e.g., data usage rates over time, etc.), group identity, and the like. The database may further comprise data including telecom data, financial data (e.g., banking data, mobile money data, etc.), and prior usage data.

Regarding group identity, the system can define a set of groups and classify any specific user into one or more such groups. The groups may, for example, be classified according to typical usage patterns. For example, groups may be segmented according to age (e.g., users in any of the following age groups: 20-25, 25-30, 30-35, etc., or some other method of grouping by age), occupation (e.g., users that are academics, businesspeople, etc.), location, etc., as suitable or desirable. Groups may comprise a plurality of users and user profiles, and the groups may be dynamic such that the users within a group and/or the definition/characteristics of a group are updated as appropriate. The use of groups allows the systems herein to make more accurate predictions in terms of network usage by users. Groups may be continuously monitored and used in determining network access. For example, a group may be created for users that tend to stream sports broadcasts, and the individual users of such a group may be prioritized (or not) when the system determines that a sporting event is planned and approaching.

Access Point and Algorithm

The user (i.e., the SIM) making a request for access can be any user desiring to use an access point. The access point is a network access point, and is operated by an internet service provider. The access point may be located (physically) in any convenient spot, such as those that are typical for such devices—e.g., coffee shops, hotels, or the like. The ISP may be a telecom provider such as a national carrier or a private carrier of telecommunications services. The ISP may have a subscriber base (i.e., a group of users that have registered for a SIM or any other service with the telecom), although the specific user requesting access at an access point may or may not be in that subscriber base. Whether the subscriber is in the user base of the ISP operating the access point is only one of many factors that can be considered by the systems/methods herein in granting access. The access point will contain any necessary infrastructure necessary or desirable to provide network access. This may include a router, a WiFi transmitter, a power source, and the like.

The systems and methods use the data described herein (e.g., contextual, semi-contextual, and user-specific) to evaluate the appropriate level of access to grant to the user. The appropriate level is determined algorithmically, and automatically, when the system receives a request for access from a user. The "algorithm" can be any suitable algorithm. Simple algorithms (e.g., if/then/else or the like) are suitable, as are weighted versions thereof, and the like. The algorithm can be refined as necessary to provide more fine-grained distribution and allocation of access, speed, etc.

Token

As a result/output of the algorithmic analysis of the various sources of data, the systems herein determine a variety of factors pertaining to access granted to the user. Such factors include, for example, the access speed, length of time before the access expires, total data available for upload and/or download, and any restrictions as to content, data/file type, or activities. Other factors may also be determined as appropriate or necessary. These factors (collectively referred to herein as the "level" of access granted) are then encoded, by the system, into a token. In embodiments the token may be transmitted to the access point, and the access point may become the gatekeeper for access by the user. Alternatively or in addition, the token may be delivered to another recipient (e.g., a server with the ISP operating the access point) in order to regulate the access by the user.

In embodiments, the token may be an access code that is delivered directly to the user, with the intention that the user enter the access code into an access portal page at the access point. For example, the token may comprise a unique code, such code being delivered to the user for the user to provide to the ISP (or the unique code being delivered directly to the ISP and identifying the user device to which the code pertains). For example, the unique code may be an image, a scan-able code, or an alpha-numeric code.

In embodiments, the access token specifies a usage level limit based on the predicted usage level of the user. The usage level limit can be one of time or data capacity, or another measure of network usage, or a combination thereof. In embodiments, the access token comprises a time stamp. In embodiments, the access token may be verifiable, such that the ISP, telecom, and/or access point can verify (directly from the system or via a check for internal consistency within the token and the requested access) that the user, access token, and access request are consistent. This verifiability may be an important security measure, such as for monitoring access of a network by users.

In embodiments where the token is delivered to the user device, the token may be configured to alter a user interface on the device, or may be configured to alter an internal setting in the device. For example, the token may be configured to automatically alter a user interface to display an access code on a display of the user device, or configured to announce the access code in an audible output. The token may be configured to automatically alter an internal setting such as a password management component of the software of the user device. Other methods for altering the user device in order to utilize the token for network access are also possible.

Uses and Advantages

In embodiments, as described herein, the invention involves the technical extracting/communicating the SIM details over a wifi network. In embodiments, the invention further involves the measure of customer loyalty based on the extracted data from the SIM. Where possible, the system requests and receives some or all of this data directly from the SIM, whereas in other embodiments this information may be obtained from the ISP and/or telecom involved previously in providing services to the user.

In embodiments, the invention is distinct from prior systems in a variety of ways, some of which are described in the following paragraphs. In embodiments, the system/method determines the user loyalty score on pre-paid mobile device based on past data bundle purchases and usage. The determination of the locality score S may be changed based on mobile money transactions (e.g., from the M-PESA® mobile money transfer system of SAFARICOM® in Kenya, or another mobile money transfer system), mobile money loan transactions (e.g., from the mobile money loan system M-SHWARI® of SAFARICOM® in Kenya, or another mobile money loan system), the usage of the GSM network (voice and data), historic pattern of data bundle usage and amount paid, type of services and usage information, etc., as well as based on the user profile, contextual factors, etc.

In embodiments, the system and method in real-time assesses the user cohort such as loyalty group, user job type, etc. In embodiments, the system determines the access or usage limit L of the customer based on said cohort (e.g. the user's calendar or historical information informs the system that it is time that the user typically streams video or reads news).

In embodiments, the system focuses on granting a user access and/or Wifi service, among others, by determining or estimating the user loyalty score S on pre-paid SIM enabled device (e.g., mobile phone, tablet, iPad, sensors, etc.), assessing of said user context C, and determining access or usage limit L based on said context (e.g. a user is lost and trying to look up an electronic calendar or a map).

The invention addresses both scope (granting access to a wifi service compared to just short messages) and method. The invention permits access to services based on previous customer behavior (e.g., a loyalty score, S) which uses much more data than a current pre-paid balance as specified in the above invention. The determination of the locality score S may be changed based on mobile money transactions (e.g., M-PESA®, M-SHWARI®), the usage of the GSM network (voice and data), historic pattern of data bundle usage and amount paid, type of services and usage information, and based on the user profile etc. In embodiments, the invention is not limited to a binary "allow access/do not allow access" action—rather, the invention allows for a variety actions (no connection, connection limited by time, connection limited by data volume, connection limited by data rates, connection limited to certain content).

The loyalty score described herein is based on user behavior while they are not connected to the wifi service (e.g., past history data, usage patterns, etc.). Past interactions with the wifi provider (likely a telecom but also possible other entities as described herein) that helps determine access quality. Real-time interaction with the wifi service may also alter a customer's loyalty score as appropriate or desired.

In embodiments, the systems/methods herein provide a method to gate access to customers for public wifi. The provider has a great amount of flexibility to determine the requirements and the rewards for loyal customers. A loyal customer reaching a predetermined threshold can be offered free WiFi based on usage of the provider's network or other factors. Customer segmentation becomes possible based on cell phone usage, other cell phone factors, or other factors including contextual factors. For example, and ISP or other provider can install a WiFi system covering a specific location with a high population density. The provider can then determine the factors that allow customers access to the network—e.g., frequent use of a telecom services or frequent shopping at a specific location/shop. This system is beneficial to telecoms, also, because it encourages proliferation of WiFi systems and allows the telecom to push users to the WiFi systems, rather than using the 3G or 4G network.

For all of the methods disclosed herein, the invention is intended to encompass systems capable of carrying out such methods. Such systems may include, for example, a server (i.e., a processor (or multiple processors), memory coupled to the processor comprising machine readable instructions suitable to instruct the processor to carry out the methods, a communications module configured to allow the server processor to communicate via a distributed network, etc.), and optionally a user device. The system may further comprise a data retrieval module configured to query a database (either locally stored on the server or externally stored remotely from the server) and retrieve data from the database (e.g., user profile data). Multiple servers and user devices are also envisioned to be within the scope of the invention. The communication module of the server is configured to carry out all necessary communications with user devices and with external components and external third party components/data sources. The systems herein may comprise an algorithm module specifically configured to carry out the analysis steps described herein (e.g., from aggregated data from various data sources, algorithmically determine a loyalty score, an access level, etc., and generate a token based on such functions). The systems herein may comprise an output module configured to prepare a message, the message comprising the token and any accompanying data/instructions necessary or desirable to allow the token to be received by a user or ISP/telecom, and the proper network access granted based on the token.

Various embodiments of the invention are described more fully hereinafter with reference to the accompanying drawings. The invention herein may be embodied in many different forms and should not be construed as limited to the embodiments set forth in the drawings; rather, these embodiments are provided to provide further illustrative non-limiting examples. Arrowheads in the figures are provided merely as examples of directions for the flow of data but are not exhaustive and are not meant to be limiting—i.e., data may also flow (where appropriate) in directions that are not shown by arrowheads in the figures. Similar numbers in different figures are meant to refer to similar components.

With reference to FIG. 1, there is shown a schematic showing user access of a network and content on the network according to an embodiment of the disclosure. User 10 (of which there may be one or more) requests network access via access point 200. Access point 200 accesses network 300, and via such access, communicates with system 100, a system according to this disclosure. System 100 informs access point 200 of the type and level of access to be granted to user 10. Via such granted access, user 10 is then able to reach content 500 on network 300.

Figure 2:
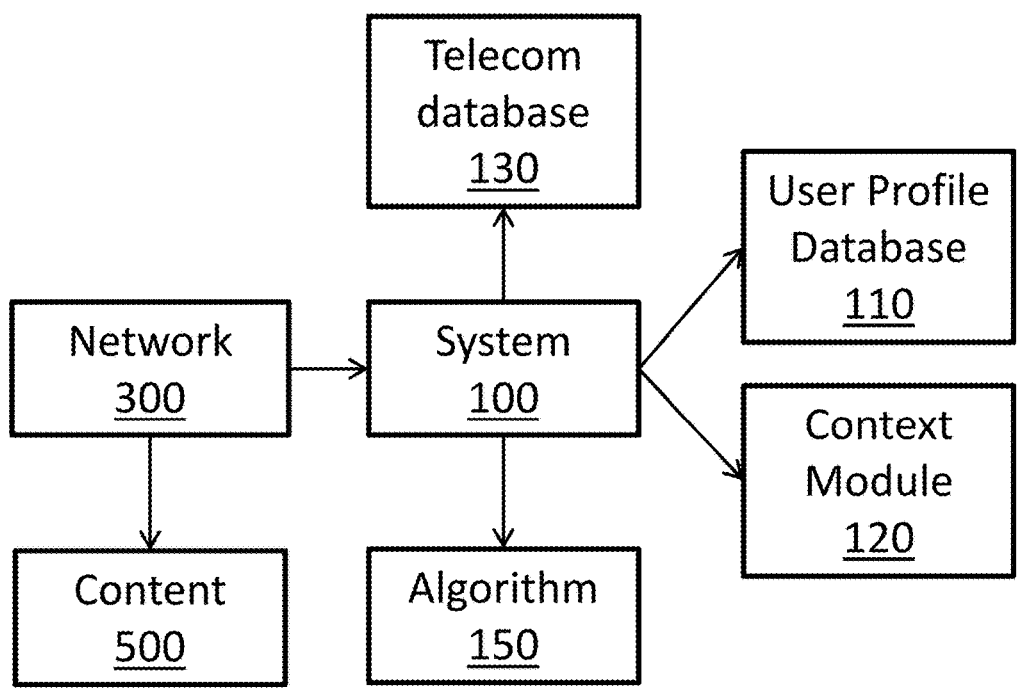
FIG. 2 provides a schematic showing modules and components of a system according to an embodiment of the disclosure.

With reference to FIG. 2 there is shown a schematic showing modules and components (both internal and external) of a system according to an embodiment of the disclosure. Thus, system 100 receives data from telecom database 130 about a user (not shown). System 100 also receives a user profile about the user from (an internal or external) user profile database 110. System 100 also receives contextual information about a user request rom context module 120. Furthermore system 100 aggregates all data received and processes such data via algorithm 150 in order to determine an access token.

Figure 3:
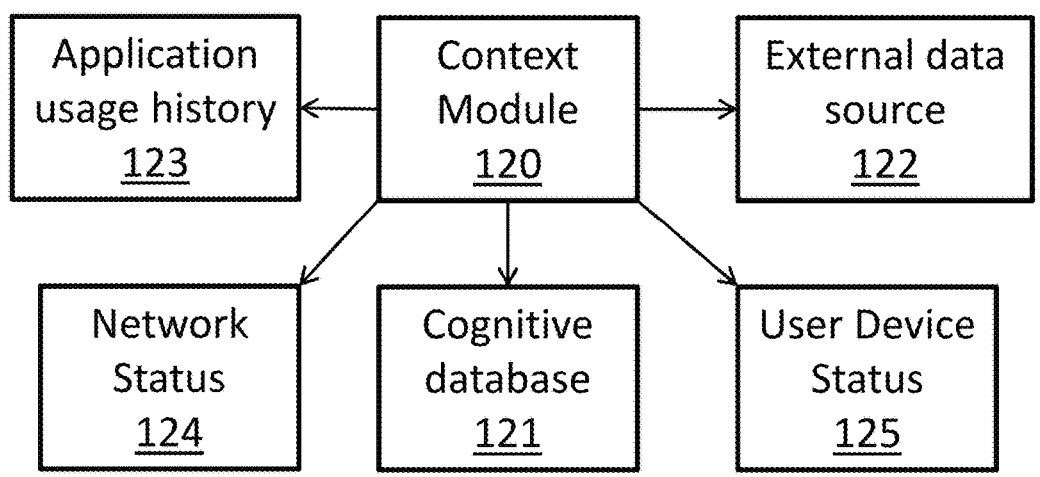
FIG. 3 provides a schematic showing sources of data accessed by a context module according to an embodiment of the disclosure.

With reference to FIG. 3, there is shown a schematic showing sources of data accessed by context module 120 according to an embodiment of the disclosure. Some of the sources of data are optional and may or may not be accessed for any specific user access request. Context module 120 may receive a user device status 125, e.g., directly from the user device (not shown). Such status might include a battery level, a network signal strength, or the like. Context module 120 may receive a network status 124, e.g., the number of users on the network in the same cell/region as the user from which the request is received, the network load/usage (instantaneous and/or historical), or the like. Context module 120 may receive contextual information about the user from the user device (e.g., emotional state, etc.), and may submit such information to cognitive database 121 in order to determine an appropriate response or approach for treating such contextual information. Context module 120 may receive data from external data source(s) 122, including weather reports, social media usage or content, news reports, emergency responder reports, or the like. Context module 120 may receive application usage history 123 from the user device, which information includes the applications in use (instantaneously and/or historically) and the amount/type/intensity of such usage.

Figure 4:
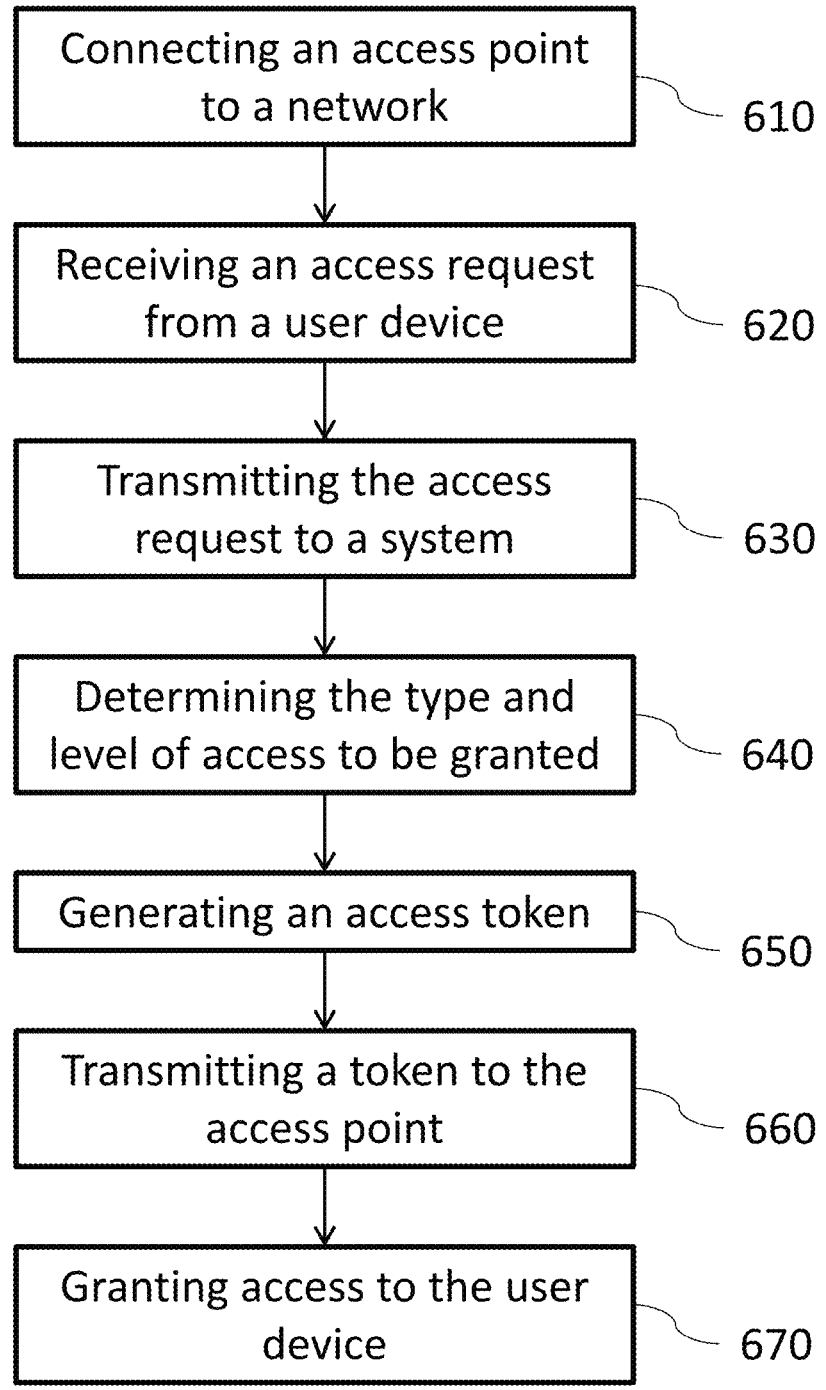
FIG. 4 provides steps in a method of accessing a network according to an embodiment of the disclosure.

With reference to FIG. 4, there are shown steps in a method of accessing a network according to an embodiment of the disclosure. A provider connects an access point to a network (610) in order to allow users to wirelessly access the network. The access point receives an access request from a user device (620), and transmits the access request to a system according to this disclosure (630), via the network. The system determines the type and level of access to be granted (640) according to the methods disclosed herein. The system then generates an access token (650) and transmits the access token to the access point (660). The access point then grants network access to the user device (670) according to the access token.

Throughout this disclosure, use of the term "server" is meant to include any computer system containing a processor and memory, and capable of containing or accessing computer instructions suitable for instructing the processor to carry out any desired steps. The server may be a traditional server, a desktop computer, a laptop, or in some cases and where appropriate, a tablet or mobile phone. The server may also be a virtual server, wherein the processor and memory are cloud-based.

The methods and devices described herein include a memory coupled to the processor. Herein, the memory is a computer-readable non-transitory storage medium or media, which may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Throughout this disclosure, use of the term "or" is inclusive and not exclusive, unless otherwise indicated expressly or by context. Therefore, herein, "A or B" means "A, B, or both," unless expressly indicated otherwise or indicated otherwise by context. Moreover, "and" is both joint and several, unless otherwise indicated expressly or by context. Therefore, herein, "A and B" means "A and B, jointly or severally," unless expressly indicated otherwise or indicated otherwise by context.

It is to be understood that while the invention has been described in conjunction with examples of specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. The pertinent parts of all publications mentioned herein are incorporated by reference. All combinations of the embodiments described herein are intended to be part of the invention, as if such combinations had been laboriously set forth in this disclosure.

EXAMPLES

Use Case: Customer A, B, and C all have accounts (SIM cards) with a telecom.

The telecom has recently introduced Wifi at a local market and busy bus station. Customer A only uses the telecom service for mobile-money transactions. Customer B occasionally uses the telecom service for voice, but no data. Customer C regularly uses the telecom service for both voice and data and currently has a large balance of both. The three customers come into range of the Wifi signal and attempt to join the network.

Upon requesting to join the network the system and method inspects the SIM cards in the devices and reaches the following conclusions. Customer A has little to no loyalty to the telecom and is required to pay a small fee in order to access the Wifi service. The customer is instructed that more frequent use of the GSM services will remove this requirement.

Customer B has a low loyalty score and required to make a small data bundle purchase (e.g., 100 MB) in order to use the Wifi service. The Wifi service does not consume this data, but the balance is required to access the service. The data bundle may be used at a later time through GSM and contributes to future telecom loyalty.

Customer C is granted Wifi access (and at higher speeds) due to their transaction history with the telecom.

These three example results cover some of the more common examples but, as described herein, are not exhaustive.

What is claimed is:

1. A method of mediating access to a computer network, the method comprising:
    identifying a user who wishes to access the computer network via a user device;
    obtaining loyalty data specific to the user;
    obtaining a user context factor specific to the user and determining a predicted usage level from the user context factor specific to the user;
    determining a loyalty score specific to the user based on the loyalty data specific to the user and used to determine a level of usage that rewards loyalty by the user;
    generating an access token based on the loyalty data specific to the user, the loyalty score, and the predicted usage level; and
    providing an output of a unique code derived from the access token, and transmitting the unique code to the user device, wherein the unique code is for one time access to the computer network, and requires validation by a gateway of the computer network for the user to access the computer network.

2. The method according to claim 1, wherein the access token specifies a usage level limit based on the predicted usage level.

3. The method according to claim 1, wherein identifying the user who wishes to access the computer network comprises accessing a database and retrieving from the database a profile for the user that specifies the loyalty data specific to the user.

4. The method according to claim 1, further comprising identifying a group to which the user belongs and obtaining group contextual data specific to the identified group, and wherein the identified group comprises a plurality of users, and wherein the access token is further based on the obtained group contextual data.

5. The method according to claim 1, wherein the access token further comprises a time stamp.

6. The method according to claim 1, wherein the unique code is an image, a scannable code, or an alpha-numeric code.

7. The method according to claim 1, further comprising:
    receiving a request from the user for access to the computer network; and
    providing access to the computer network to the user according to the token.

8. The method according to claim 1, further comprising:
    receiving a request from the user for access to the computer network;

checking that the request received from the user to access the computer network is derived from the output provided to the user; and providing access to the computer network to the user according to the token.

9. The method according to claim 1, wherein the user device comprises a SIM and wherein accessing the computer network is via a WiFi connection.

10. The method according to claim 1, wherein the loyalty score is determined based at least in part on statistical machine learning techniques and wherein the loyalty data specific to the user is telecom data specific to the user.

11. The method of claim 1, wherein the loyalty score is determined based at least in part on predicted future behavior of the user.

12. The method of claim 1, wherein the user context factor is determined from data received from the user device or from an external source, and wherein the access token is further based on the user context factor.

13. The method of claim 1, wherein the access token is further based on one or more factors selected from: a current overall usage level of the computer network; the user's prior usage behavior; service type; and a current signal strength for the user device in accessing the computer network.

14. The method of claim 1, wherein the output is configured to alter a user interface on the user device.

* * * * *